C. J. ROBINSON.
VARIABLE SPEED TRANSMISSION DEVICE.
APPLICATION FILED FEB. 23, 1911.

1,027,767.

Patented May 28, 1912.

WITNESSES:
L. G. Zesbaugh
H. Barnes

INVENTOR:
Charles J. Robinson
BY
Pierre Barnes
ATTORNEY

UNITED STATES PATENT OFFICE.

CHARLES J. ROBINSON, OF BREMERTON, WASHINGTON, ASSIGNOR OF ONE-HALF TO ERNEST E. CREELMAN, OF BREMERTON, WASHINGTON.

VARIABLE-SPEED TRANSMISSION DEVICE.

1,027,767.  Specification of Letters Patent.  Patented May 28, 1912.

Application filed February 23, 1911. Serial No. 610,357.

*To all whom it may concern:*

Be it known that I, CHARLES J. ROBINSON, a citizen of the United States, residing at Bremerton, in the county of Kitsap and State of Washington, have invented certain new and useful Improvements in Variable-Speed Transmission Devices, of which the following is a specification.

The object of this invention is the improvement in variable speed power transmission devices, whereby the speed of a driven shaft may be conveniently regulated and without sacrificing the power efficiency.

The invention consists in the novel construction and combination of parts, as will be hereinafter described and claimed.

Figures 1, 2:
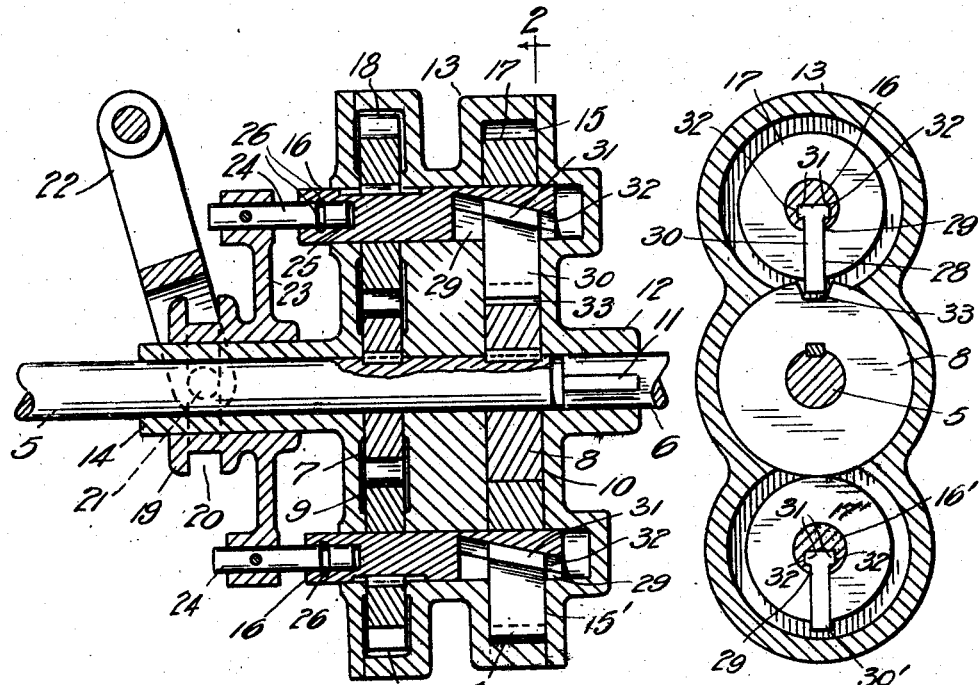
Figure 4:
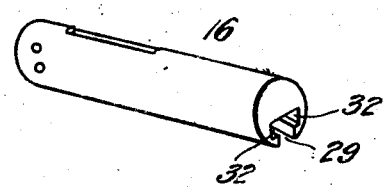
Figure 3:
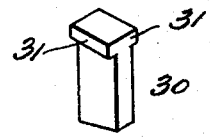

In the accompanying drawings, Figure 1 is a longitudinal section of mechanism embodying my invention. Fig. 2 is a transverse section through 2—2 of Fig. 1. Fig. 3 is a perspective view of one of the obturating blades such as shown in the preceding views; and Fig. 4 is a similar view of a controlling arbor therefor.

The reference numeral 5 designates a driving shaft and 6 a driven shaft which are disposed in axial alinement. Keyed or otherwise secured to said driving shaft is a spur pinion 7 and a cylindrical element, or wheel, 8 respectively disposed in chambers 9 and 10 of said casing.

Fixedly secured, as by a key 11, to the driven shaft is the hub 12 of a casing 13, and at the opposite end of the casing is provided a tubular boss 14. The driving shaft 5 extends through said boss and desirably into the bore of the hub 12.

Located upon diametrically opposite sides of the axis of the shaft 5 and centrally of the casing chambers 15 and 15' are arbors 16 which carry cylindrical rotary elements 17 and 17'.

The chambers 10, 15 and 15' are of equal lengths and the diameter of the first named one is equal to the diameter of the contained element 8. The radii of the other elements 17 and 17' are such that the peripheries of the elements will contact with the periphery of the element 8. The diameters of the chambers 15 and 15' are, however, of greater diameters than the contained elements, consequently, there is afforded about each of the latter an annular space into which the element 8 protrudes.

Splined to arbors 16 and 16' are gear wheels 18 and 18' in mesh with the teeth of the aforesaid pinion. Said arbors are journaled in bearings provided in the casing and extend outside of the casing, as shown in Fig. 1.

The boss 14 serves as a bearing for a sleeve 19 having a circumferential groove 20 into which project studs 21 provided in the forked end of a lever 22 which is employed for giving endwise motion to said sleeve.

23 are arms extending from the sleeve carrying pins 24 which project into holes 25 bored into the respective arbors and are secured against withdrawal by pins 26 extending through the arbors and into annular grooves of the pins 24. The elements 17 and 17' are each provided with a slot 28 which are in the radial planes with slots 29 of the arbors. Seated in the slots are blades 30 and 30' provided with transverse wings 31 which fit into inclined guideways 32 provided in the side walls of the arbor slots 29, whereby said blades are caused by longitudinal movements of the arbor to be thrust radially in or out of the annular spaces about the respective elements. The element 8 is formed with a notch 33 in its periphery to accommodate alternately the blades 30 and 30' when the latter are protruded outside of the circumferences of the elements 17 and 17'. The spaces unoccupied by the elements 17 and 17' within the chambers 15 and 15' are filled with oil or other suitable fluid.

The operation of the invention is as follows: The shaft 5 being rotated to impart rotary motion to the element 8 and the toothed pinion 7 positively drives the arbors 16 and 16' through the agency of said pinion and the gear wheels 18 and 18'. The elements 17 and 17' secured for rotation to the arbors are thus driven simultaneously with, but in opposite directions from, the element 8. When the blades 30 and 30' are retracted to be within the circumference of the elements 17 and 17' by suitable endwise movements of the arbors 16 and 16' (derived from a manipulation of the aforesaid lever 22) the elements 17 and 17' turn within their chambers with an inappreciable resistance with respect to the oil. When these elements are thus rendered free to turn there is no operative connection between the driving shaft 5 and driven shaft 6, and the driven shaft is idle. When the blades 30 and 30' are protruded outside of the circumferences of the elements 17 and 17', the liquid in advance of the blades, or between the latter and the part of the element 8 which extends into the respective chambers 15 and 15', will resist the turning of the elements 17 and 17' proportionately to the amount of the protrusion of the blades. With the blades protruded to contact with the peripheral walls of the chambers 15 and 15', the oil, subject to any leakage about the blades or between the elements, will arrest the turning of the blades about their arbor axes with the result that the casing 13 will be rotated to drive the driven shaft 6 at substantially the speed of the driving shaft. Less speeds for the shaft 6 being obtained by regulating the exposure of the blades to the required amount.

The invention is simple in construction and well adapted for the purposes of the invention.

Various changes may obviously be made from the aforedescribed embodiment of the invention without departing from the spirit of the invention. For example, the casing may be made in the shape of a pulley or wheel whence the power may be utilized by selected power drives, such as a belt, gearing, etc., and with the elimination of a driven-shaft, as illustrated. Furthermore, instead of employing a pair of elements 17 and 17' and the associated parts therewith, one or more such groups of elements may be employed.

What I claim, is—

1. In a variable speed transmission device, the combination with a driving shaft, and a series of toothed gears driven from said shaft, of a series of elements rotated by said shaft and said gears, a casing provided with chambers for the respective elements, and means carried by and adjustable radially in one of said elements to coact with a liquid provided in the chamber of such element for causing the casing to be rotated by the shaft.

2. In a variable speed transmission device, a shaft, a casing, an element driven by said shaft and rotatable in a chamber provided in said casing, a second element rotatable in a second chamber of the casing, power driven means operated by said shaft tending to rotate said second element, and adjustable means carried by the second named element which is arranged to be influenced by a liquid contained in said second chamber whereby the casing is yieldingly coupled to the shaft.

3. In a variable speed transmission device, the combination with a power shaft, a toothed pinion, and an element having a gap in its periphery secured to the shaft, of a gear wheel in mesh with said pinion, a second element rotatable with said gear wheel, a blade carried by the second named element, means for adjusting the position of said blade radially of the element, a casing for said elements and provided with a chamber in which the first named element is fitted and also provided with another chamber of greater diameter than that of the second named element, to afford space about the latter to accommodate a supply of liquid.

4. A variable speed transmission device, comprising a driving shaft, a toothed pinion mounted on said shaft, a cylindrical element mounted upon the shaft and provided with a gap in its periphery, a gear wheel in mesh with the pinion, an arbor carrying said wheel, a second element mounted on the arbor, a blade carried in said second element, a casing provided with chambers for the respective elements, the chamber for the second named element being of greater diameter than the diameter of the element, and means operating through the medium of the arbor whereby the blade is adjustable radially to and from the peripheral wall of the chamber of the second named element for the purpose described.

In testimony whereof I have affixed my signature in presence of two witnesses.

CHARLES J. ROBINSON.

Witnesses:
H. BARNES,
E. PETERSON.